(12) United States Patent
Guan et al.

(10) Patent No.: US 11,886,583 B2
(45) Date of Patent: Jan. 30, 2024

(54) DESCRIPTION-ENTROPY-BASED INTELLIGENT DETECTION METHOD FOR BIG DATA MOBILE SOFTWARE SIMILARITY

(71) Applicant: Jinan University, Guangdong (CN)

(72) Inventors: Quanlong Guan, Guangdong (CN); Weiqi Luo, Guangdong (CN); Chuying Liu, Guangdong (CN); Huanming Zhang, Guangdong (CN); Lin Cui, Guangdong (CN); Zhefu Li, Guangdong (CN); Rongjun Li, Guangdong (CN)

( * ) Notice: Subject to any disclaimer, the term of this patent is extended or adjusted under 35 U.S.C. 154(b) by 412 days.

(21) Appl. No.: 17/312,449

(22) PCT Filed: Apr. 22, 2020

(86) PCT No.: PCT/CN2020/086052
§ 371 (c)(1),
(2) Date: Jun. 10, 2021

(87) PCT Pub. No.: WO2020/233322
PCT Pub. Date: Nov. 26, 2020

(65) Prior Publication Data
US 2022/0058263 A1  Feb. 24, 2022

(30) Foreign Application Priority Data
May 21, 2019  (CN) .......................... 201910424145.7

(51) Int. Cl.
G06F 7/04 (2006.01)
G06F 15/16 (2006.01)
H04L 29/06 (2006.01)
G06F 21/56 (2013.01)
G06F 8/74 (2018.01)

(52) U.S. Cl.
CPC .............. *G06F 21/563* (2013.01); *G06F 8/74* (2013.01)

(58) Field of Classification Search
CPC .................................. G06F 21/563; G06F 8/74
USPC ........................................................... 726/24
See application file for complete search history.

(56) References Cited

U.S. PATENT DOCUMENTS

2013/0067579 A1* 3/2013 Beveridge ............. G06F 21/565
726/24
2017/0063913 A1* 3/2017 Hu ........................... H04L 67/34

* cited by examiner

*Primary Examiner* — Jeffrey C Pwu
*Assistant Examiner* — Samuel Ambaye

(57) ABSTRACT

Disclosed is a description-entropy-based intelligent detection method for a big data mobile software similarity. The method comprises the following steps: acquiring a path of mobile software, and reading a file of the mobile software according to the path; performing preliminary reverse engineering decompilation on the file of the mobile software to obtain function characteristics of each piece of mobile software; counting distribution of description entropy of each piece of mobile software by means of description entropy in the function characteristics; further integrating description entropy of each piece of mobile software, after integration, comparing description entropy distribution conditions among the mobile software, and carrying out similarity score calculation to obtain similarity scores among the mobile software; and outputting the similarity scores of all mobile software to obtain a mobile software similarity result. According to the method, a source code of the mobile software is acquired by means of decompilation, a function compression code is acquired, and then the description entropy is acquired; and the description entropy is used as an information amount for representing an object and used for similarity detection of the mobile software, thus greatly increasing the speed of intelligent calculation of software similarity.

8 Claims, 2 Drawing Sheets

DESCRIPTION-ENTROPY-BASED INTELLIGENT DETECTION METHOD FOR BIG DATA MOBILE SOFTWARE SIMILARITY

Description-entropy-based intelligent detection method for big data mobile software similarity

BACKGROUND OF THE INVENTION

The present invention relates to the field of software similarity determination, and in particular to a method for intelligent determination of similarity of big data mobile softwares based on descriptive entropy.

With the rapid development of the Internet and smart phones, mobile Internet softwares are rapidly popularized, especially the application softwares with mobile phone as the operating platform, resulting in a great number of released mobile Internet softwares every year. However, due to the open source and popularity of mobile Internet softwares, security issues have become increasingly prominent. Tens of thousands of malicious softwares are intercepted by various mobile application security platforms every day. Malicious mobile Internet softwares may expose the mobile phone to virus attack, steal account information, and even charge fees and acquire private user information beyond their authority. With challenges of severe mobile application security events and massive malwares, improving the efficiency of malware determination has become an issue worth exploring.

At present, most malicious attackers modify part of the source codes of a popular mobile application software, add malicious codes and obfuscations thereto, and release the application. Many users may mistakenly download and install the pirate application due to their trust and support for the original application. Similarity determination of applications is a breakthrough in mobile application security engineering.

BRIEF SUMMARY OF THE INVENTION

The present invention is mainly intended to overcome the shortcomings and deficiencies in the prior art and to provide a method for determining the similarity of mobile softwares based on descriptive entropy distribution.

The purpose of the present invention is implemented through the following technical solutions:

Disclosed herein is a method for intelligent determination of similarity of big data mobile softwares based on descriptive entropy, comprising the following steps:

S1, acquiring a path for each of the mobile softwares to read the mobile softwares according to the paths;

S2, performing a preliminary reverse-engineering decompilation on each of the mobile softwares to acquire function characteristics for each of the mobile softwares;

S3, summarizing a descriptive entropy distribution for each of the mobile softwares through descriptive entropies in the function characteristics;

S4, integrating the descriptive entropies of the mobile softwares, comparing the descriptive entropy distributions of mobile software pairs based on the integrated descriptive entropy distributions, and calculating similarity scores of the mobile software pairs; and S5, outputting the similarity scores of the mobile softwares to give a mobile software similarity result.

Furthermore, the function characteristics include: hash values, mobile software function compression codes, and descriptive entropies.

Furthermore, in step S2, the preliminary reverse-engineering decompilation specifically comprises: acquiring source codes for each of the mobile softwares using a decompilation tool, acquiring function compression codes for each of the mobile softwares through the source codes, and calculating a floating point number representing an amount of information of a function or class (i.e., the descriptive entropy) from each of the function compression codes by the following formula:

$$Hd(\text{substr}_i) = -\Sigma_{i=0}^{n} p(\text{substr}_i)\log_2 p(\text{substr}_i);$$

wherein, assuming that each of the function compression codes has n substrings, $\text{substr}_i$ is the $i^{th}$ substring of the function compression code, and $p(\text{substr}_i)$ is the occurrence probability of the $i^{th}$ substring; and storing the function compression codes, descriptive entropies, and hash values for the mobile softwares in corresponding text files.

Furthermore, for the function or class, one function or class corresponds to one function compression code, one descriptive entropy and one hash value; one mobile software corresponds to a set of function compression codes, a set of descriptive entropies, and a set of hash values for corresponding functions.

Furthermore, the decompilation tool is Androguard.

Furthermore, step S3 specifically comprises: extracting, from each of the text files corresponding to each of the mobile softwares in step S2, a set of descriptive entropies:

$$Hd = \{hd_1, hd_2, hd_3, \ldots, hd_n\};$$

and a set of corresponding numbers of entropies:

$$N = \{n_1, n_2, n_3, \ldots, n_n\};$$

wherein, $hd_1$ to $hd_n$ are the $1^{st}$ to the $n^{th}$ unequal descriptive entropy values of the corresponding mobile software; $n_1$ to $n_n$ are corresponding numbers of the $1^{st}$ to the $n^{th}$ unequal descriptive entropy values.

Furthermore, step S4 specifically comprises: acquiring the sets of descriptive entropies for all the mobile softwares, and integrating the sets of descriptive entropies for all the mobile software in pairs to obtain a union of descriptive entropies for each pair of mobile softwares;

sets of descriptive entropies for mobile software A and mobile software B are as follows:

$$Hd_A = \{hd_{A1}, hd_{A2}, hd_{A3}, \ldots, hd_{Am}\};$$

$$Hd_B = \{hd_{B1}, hd_{B2}, hd_{B3}, \ldots, hd_{Bn}\};$$

wherein, $Hd_A$ is the set of descriptive entropies for mobile software A, $Hd_B$ is the set of descriptive entropies for mobile software B, m is a number of descriptive entropy values of mobile software A, and n is a number of descriptive entropy values of mobile software B;

sets of numbers of descriptive entropy values of mobile software A and mobile software B are as follows:

$$N_A = \{n_{A1}, n_{A2}, n_{A3}, \ldots, n_{Am}\};$$

$$N_B = \{n_{B1}, n_{B2}, n_{B3}, \ldots, n_{Bn}\};$$

wherein, NA is the set of corresponding numbers of descriptive entropy values in HdA of mobile software A, and NB is the set of corresponding numbers of descriptive entropy values in HdB of mobile software B;

the union of descriptive entropies for the mobile software pair is as follows:

$$Hd_{A \cup B} = Hd_A \cup Hd_B;$$

$$Y_A = (y_{Ai} \mid i = 1, 2, \ldots, m+x);$$

$$x = |Hd_{A \cup B} - Hd_A|;$$

$$y_{Ai} = \begin{cases} n_{Aj}, & (hd_{A \cup Bi} \in Hd_A, hd_{A \cup Bi} = hd_{Aj}, n_{Aj} \in N_A) \\ 0, & (hd_{A \cup Bi} \notin Hd_A) \end{cases};$$

$$Y_B = (y_{Bi} \mid i = 1, 2, \cdots, n+y);$$

$$y = |Hd_{A \cup B} - Hd_B|;$$

$$y_{Bi} = \begin{cases} n_{Bj}, & (hd_{A \cup Bi} \in Hd_B, hd_{A \cup Bi} = hd_{Bj}, n_{Bj} \in N_B) \\ 0, & (hd_{A \cup Bi} \notin Hd_B) \end{cases};$$

wherein, $Hd_{A \cup B}$ is the union of descriptive entropies of mobile software A and mobile software B, $Y_A$ is the set of corresponding numbers of descriptive entropy values of mobile software A in the union $Hd_{A \cup B}$, and $Y_B$ is the set of corresponding numbers of descriptive entropy values of mobile software B in the union $Hd_{A \cup B}$; x is a number of elements in the subtraction of $Hd_A$ from the union $Hd_{A \cup B}$, and y is a number of elements in the subtraction of $Hd_B$ from the union $Hd_{A \cup B}$; m+x and n+y are numbers of elements in the union $Hd_{A \cup B}$;

calculating similarity scores:

taking the sets $Hd_{A \cup B}$ and $Y_A$ as a set of discrete points $D_A$, and the sets $Hd_{A \cup B}$ and $Y_B$ as another set of discrete points $D_B$, there are:

$$D_A = \{(x_i, y_i) \mid x_i \in Hd_{A \cup B}, y_i \in Y_A\};$$

$$D_B = \{(x_i, y_i) \mid x_i \in Hd_{A \cup B}, y_i \in Y_B\};$$

a region $S_A$ in a Cartesian coordinate system is defined by the set of discrete points $D_A$ and the X axis; a region $S_B$ in the Cartesian coordinate system is defined by the set of discrete points $D_B$ and the X axis; an intersection area $S_{A \cap B}$ of the regions $S_A$ and $S_B$ is calculated, and a union area $S_{A \cup B}$ of the regions $S_A$ and $S_B$ is calculated; finally the similarity scores are calculated:

assuming that the number of elements in the set is N, there is:

$$S_{A \cap B} = \sum_{i=1}^{N-1} S_i$$

wherein, $$S_i \begin{cases} (y_{mid} + \min(y_{Ai}, y_{Bi}))^*(x_{mid} - x_i)/2 + (y_{mid} + \min(y_{Ai+1}, y_{Bi+1}))^*(x_{i+1} - x_{mid})/2, & ((y_{Ai} - y_{Bi})^*(y_{Ai+1} - y_{Bi+1}) < 0) \\ (\min(y_{Ai}, y_{Bi}) + \min(y_{Ai+1}, y_{Bi+1}))^*(x_{i+1} - x_i)/2, & ((y_{Ai} - y_{Bi})^*(y_{Ai+1} - y_{Bi+1}) > 0) \end{cases}$$

$$S_{A \cup B} = \sum_{i=1}^{N-1} s'_i,$$

wherein, $$s'_i \begin{cases} (y_{mid} + \max(y_{Ai}, y_{Bi}))^*(x_{mid} - x_i)/2 + (y_{mid} + \max(y_{Ai+1}, y_{Bi+1}))^*(x_{i+1} - x_{mid})/2, & ((y_{Ai} - y_{Bi})^*(y_{Ai+1} - y_{Bi+1}) < 0) \\ (\max(y_{Ai}, y_{Bi}) + \max(y_{Ai+1}, y_{Bi+1}))^*(x_{i+1} - x_i)/2, & ((y_{Ai} - y_{Bi})^*(y_{Ai+1} - y_{Bi+1}) > 0) \end{cases}$$

wherein, $$x_{mid} = \frac{x_{i+1}(y_{Bi} - y_{Ai}) - x_i(y_{Bi+1} - y_{Ai+1})}{(y_{Bi} - y_{Ai}) - (y_{Bi+1} - y_{Ai+1})},$$

$$y_{mid} = \frac{y_{Ai+1}(y_{Bi} - y_{Ai}) - y_{Ai}(y_{Bi+1} - y_{Ai+1})}{(y_{Bi} - y_{Ai}) - (y_{Bi+1} - y_{Ai+1})},$$

wherein, $(x_i, y_{Ai}) \in D_A$, $(x_i, y_{Bi}) \in D_B$, and $(x_{mid}, y_{mid})$ are the coordinates of the intersection point of a straight line defined by points $(x_i, y_{Ai})$ and $(x_{i+1}, y_{Ai+1})$ and a straight line defined by points $(x_i, y_{Bi})$ and $(x_{i+i}, y_{Bi+i})$;

finally the similarity scores are calculated by:

Similarity score=$S_{A \cap B}/S_{A \cup B}*100$

Furthermore, m+x=n+y.

Furthermore, step S5 specifically comprises: outputting the similarity scores of all mobile softwares, and determining similarities between mobile softwares to obtain a result of mobile software similarity.

Compared with the prior art, the present invention has the following advantages and beneficial effects:

The present invention acquires the mobile software source codes through decompilation, and then acquires a corresponding mobile software function compression code by reading the source code of each function or class. Each function compression code is a character string formed by compressing statements of a corresponding function or class according to control flowchart. The descriptive entropy is a floating point number calculated intelligently according to the function compression code. One function or class corresponds to one function compression code and one descriptive entropy. Thus a mobile software corresponds to a set of function compression codes and a set of descriptive entropies, the numbers of which depend on the total number of functions or classes. Using descriptive entropy to represent an amount of information of an object for determining mobile software similarity greatly improves the speed of intelligent software similarity calculation.

DETAILED DESCRIPTION OF THE INVENTION

The present invention will be further illustrated with reference to the following example and drawings, which, however, are not intended to limit the embodiments of the present invention.

Example

Figure 1:
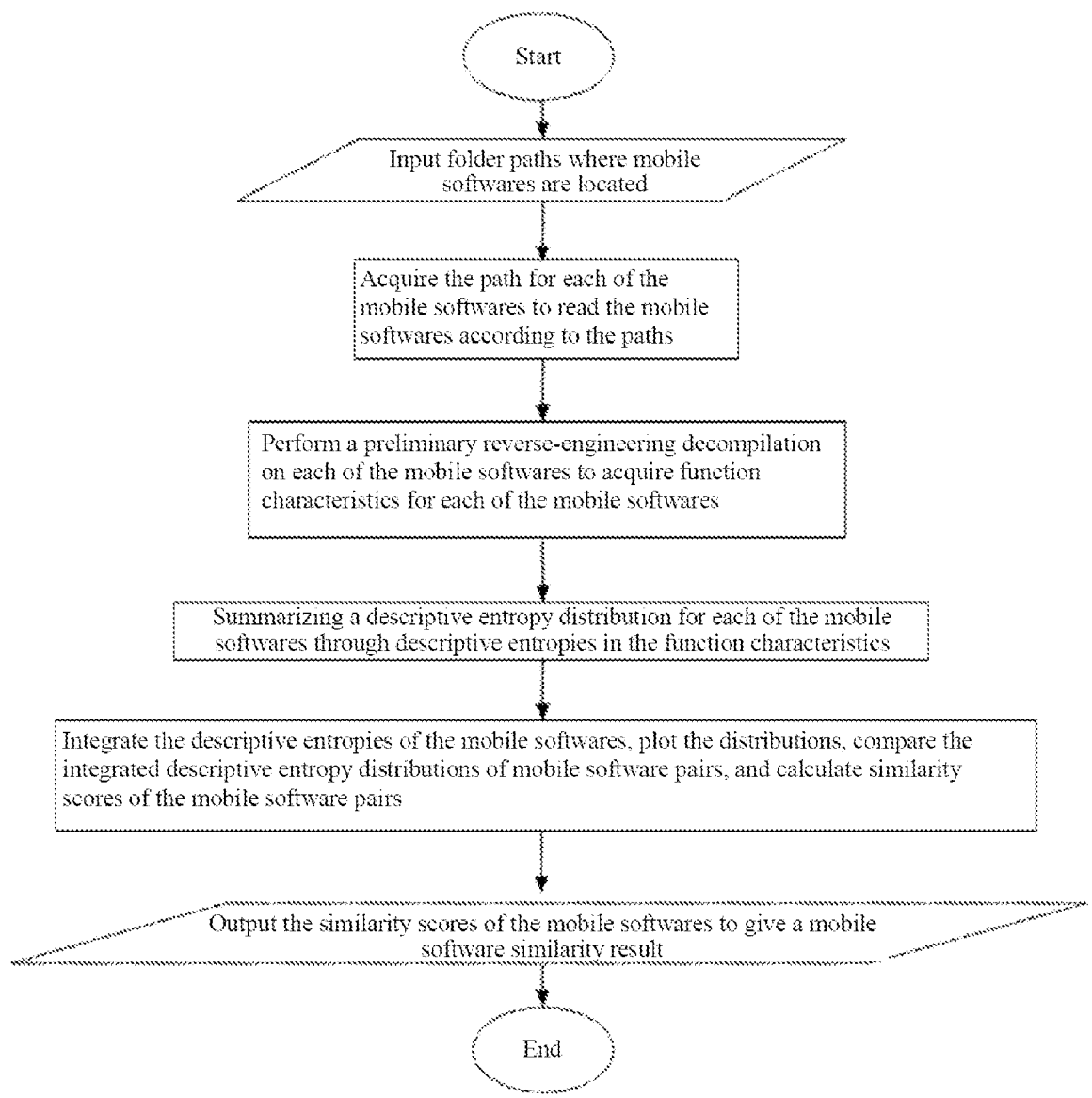
FIG. 1 illustrates the flowchart of a method for intelligent determination of similarity of big data mobile softwares based on descriptive entropy according to the present invention.

Provided is a method for intelligent determination of similarity of big data mobile softwares based on descriptive entropy, as shown in FIG. 1, comprising the following steps:

Step I, acquiring a path for each of the mobile softwares to read the mobile softwares according to the paths;

Step II, performing a preliminary reverse-engineering decompilation on each of the mobile softwares to acquire function characteristics for each of the mobile softwares;

wherein the preliminary reverse-engineering decompilation specifically comprises: acquiring source codes for each of the mobile softwares using a decompilation tool Androguard, acquiring function compression codes for each of the mobile softwares through the source codes, and calculating a floating point number representing an amount of information of a function or class (i.e., the descriptive entropy) from each of the function compression code; and storing the function compression codes, descriptive entropies, and hash values for the mobile softwares in corresponding text files; the descriptive entropy is calculated by the following formula:

$$Hd(substr_i) = -\Sigma_{i=0}^{n} p(substr_i) \log_2 p(substr_i);$$

wherein, assuming that each of the function compression codes has n substrings, $substr_i$ is the $i^{th}$ substring of the function compression code, and $p(substr_i)$ is the occurrence probability of the $i^{th}$ substring;

furthermore, for the function or class, one function or class corresponds to one mobile software function compression code, one descriptive entropy and one hash value; one mobile software corresponds to a set of function compression codes, a set of descriptive entropies, and a set of hash values for corresponding functions.

Figure 2:
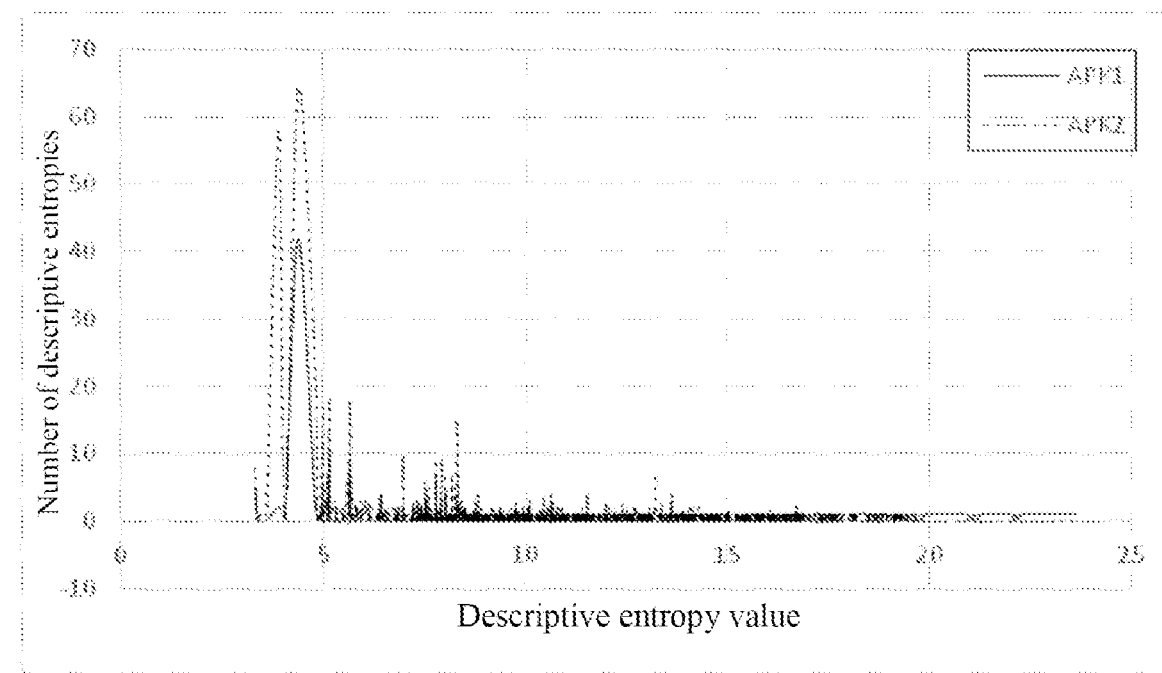
FIG. 2 illustrates the actual statistics of descriptive entropy distributions of a mobile software pair according to an embodiment of the present invention.
Figure 3:
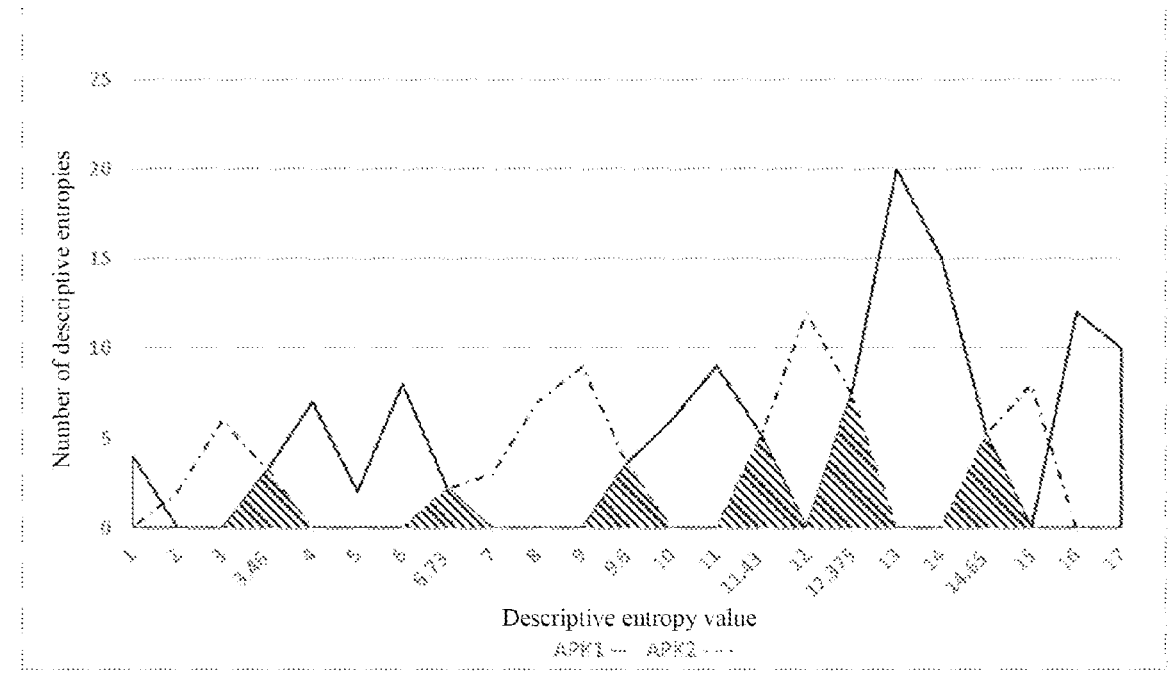
FIG. 3 illustrates a schematic of the similarity area calculation of a mobile software pair based on descriptive entropy distribution according to an embodiment of the present invention.

Step III, summarizing a descriptive entropy distribution for each of the mobile softwares through descriptive entropies in the function characteristics, specifically comprising:

extracting, from each of the text files corresponding to the mobile softwares in step II, a set of descriptive entropies:

$$Hd = \{hd_1, hd_2, hd_3, \ldots, hd_n\};$$

and a set of corresponding numbers of entropies:

$$N = \{n_1, n_2, n_3, \ldots, n_n\};$$

wherein, $hd_1$ to $hd_n$ are the $1^{st}$ to the $n^{th}$ unequal descriptive entropy values of the corresponding mobile software; $n_1$ to $n_n$ are corresponding numbers of the $1^{st}$ to the $n^{th}$ unequal descriptive entropy values;

Step IV, integrating the descriptive entropies of the mobile softwares, comparing the descriptive entropy distributions of mobile software pairs based on the integrated descriptive entropy distributions, and calculating similarity scores of the mobile software pairs; and specifically: acquiring the sets of descriptive entropies for all the mobile softwares, and integrating the sets of descriptive entropies for all the mobile software in pairs to obtain a union of descriptive entropies for each pair of the mobile softwares;

in the present embodiment, mobile software A and mobile software B are selected for comparison:

sets of descriptive entropies for mobile software A and mobile software B are as follows:

$$Hd_A = \{hd_{A1}, hd_{A2}, hd_{A3}, \ldots, hd_{Am}\};$$

$$Hd_B = \{hd_{B1}, hd_{B2}, hd_{B3}, \ldots, hd_{Bn}\};$$

wherein, $Hd_A$ is the set of descriptive entropies of mobile software A, and $Ah_1$ to $Ah_m$ are the $1^{st}$ to the $m^{th}$ unequal descriptive entropies; $Hd_B$ is the set of descriptive entropies of mobile software B, and $Bh_1$ to $Bh_n$ are the $1^{st}$ to the $n^{th}$ unequal descriptive entropies; m is a number of descriptive entropies of mobile software A, and n is a number of descriptive entropies of mobile software B;

sets of numbers of descriptive entropy values of mobile software A and mobile software B are as follows:

$$N_A = \{n_{A1}, n_{A2}, n_{A3}, \ldots, n_{Am}\};$$

$$N_B = \{n_{B1}, n_{B2}, n_{B3}, \ldots, n_{Bn}\};$$

wherein, $N_A$ is the set of corresponding numbers of descriptive entropy values in $Hd_A$ of mobile software A, and $An_1$ to $An_m$ are the number of the $1^{St}$ to the $m^{th}$ descriptive entropies; $N_B$ is the set of corresponding numbers of descriptive entropy values in $Hd_B$ of mobile software B, and $Bn_1$ to $Bn_n$ are the number of the $1^{st}$ to the $n^{th}$ descriptive entropies;

integrating the descriptive entropy distributions of mobile software A and mobile software B:

$$Hd_{A \cup B} = Hd_A \cup Hd_B;$$

$$Y_A = (y_{Ai} \mid i = 1, 2, \ldots, m+x);$$

$$x = |Hd_{A \cup B} - Hd_A|;$$

$$y_{Ai} = \begin{cases} n_{Aj}, & (hd_{A \cup Bi} \in Hd_A, hd_{A \cup Bi} = hd_{Aj}, n_{Aj} \in N_A) \\ 0, & (hd_{A \cup Bi} \notin Hd_A) \end{cases};$$

$$Y_B = (y_{Bi} \mid i = 1, 2, \ldots, n+y);$$

$$y = |Hd_{A \cup B} - Hd_B|;$$

$$y_{Bi} = \begin{cases} n_{Bj}, & (hd_{A \cup Bi} \in Hd_B, hd_{A \cup Bi} = hd_{Bj}, n_{Bj} \in N_B) \\ 0, & (hd_{A \cup Bi} \notin Hd_B) \end{cases};$$

wherein, $Hd_{A \cup B}$ is the union of descriptive entropies of mobile software A and mobile software B, $Y_A$ is the set of corresponding numbers of descriptive entropy values of mobile software A in the union $Hd_{A \cup B}$, and $Y_B$ is the set of corresponding numbers of descriptive entropy values of mobile software B in the union $Hd_{A \cup B}$; x is a number of elements in the subtraction of $Hd_A$ from the union $Hd_{A \cup B}$, and y is a number of elements in the subtraction of $Hd_B$ from the union $Hd_{A \cup B}$; m+x and n+y are numbers of elements in the union $Hd_{A \cup B}$; FIG. 2 illustrates the actual statistics of descriptive entropy distributions of a mobile software pair; the abscissa is the descriptive entropy value, while the ordinate is the number of the entropy values;

calculating similarity scores:

taking the sets $Hd_{A \cup B}$ and $Y_A$ as a set of discrete points $D_A$, and the sets $Hd_{A \cup B}$ and $Y_B$ as another set of discrete points $D_B$, there are:

$$D_A = \{(x_i, y_i) \mid x_i \in Hd_{A \cup B}, y_i \in Y_A\};$$

$$D_B = \{(x_i, y_i) \mid x_i \in Hd_{A \cup B}, y_i \in Y_B\};$$

a region $S_A$ in a Cartesian coordinate system is defined by the set of discrete points $D_A$ and the X axis; a region $S_B$ in the Cartesian coordinate system is defined by the set of discrete points $D_B$ and the X axis; an intersection area $S_{A \cap B}$ of the regions $S_A$ and $S_B$ is calculated, and a union area $S_{A \cup B}$ of the regions $S_A$ and $S_B$ is calculated; finally the similarity scores are calculated: FIG. 3 illustrates the similarity area calculation of the mobile software pair based on descriptive entropy distribution; the abscissa is the descriptive entropy value, while the ordinate is the number of the entropy values;

assuming that the number of elements in the set is N, there is:

$$S_{A \cap B} = \sum_{i=1}^{N-1} s_i;$$

wherein, $$s_i \begin{cases} (y_{mid} + \min(y_{Ai}, y_{Bi}))^*(x_{mid} - x_i)/2 + (y_{mid} + \min(y_{Ai+1}, y_{Bi+1}))^*(x_{i+1} - x_{mid})/2, ((y_{Ai} - y_{Bi})^*(y_{Ai+1} - y_{Bi+1}) < 0) \\ (\min(y_{Ai}, y_{Bi}) + \min(y_{Ai+1}, y_{Bi+1}))^*(x_{i+1} - x_i)/2, ((y_{Ai} - y_{Bi})^*(y_{Ai+1} - y_{Bi+1}) > 0) \end{cases}$$

$$S_{A \cup B} = \sum_{i=1}^{N-1} s'_i,$$

wherein, $$s'_i \begin{cases} (y_{mid} + \max(y_{Ai}, y_{Bi}))^*(x_{mid} - x_i)/2 + (y_{mid} + \max(y_{Ai+1}, y_{Bi+1}))^*(x_{i+1} - x_{mid})/2, ((y_{Ai} - y_{Bi})^*(y_{Ai+1} - y_{Bi+1}) < 0) \\ (\max(y_{Ai}, y_{Bi}) + \max(y_{Ai+1}, y_{Bi+1}))^*(x_{i+1} - x_i)/2, ((y_{Ai} - y_{Bi})^*(y_{Ai+1} - y_{Bi+1}) > 0) \end{cases}$$

wherein, $$x_{mid} = \frac{x_{i+1}(y_{Bi} - y_{Ai}) - x_i(y_{Bi+1} - y_{Ai+1})}{(y_{Bi} - y_{Ai}) - (y_{Bi+1} - y_{Ai+1})},$$

$$y_{mid} = \frac{y_{Ai+1}(y_{Bi} - y_{Ai}) - y_{Ai}(y_{Bi+1} - y_{Ai+1})}{(y_{Bi} - y_{Ai}) - (y_{Bi+1} - y_{Ai+1})},$$

wherein, $(x_i, y_{Ai}) \in D_A$, $(x_i, y_{Bi}) \in D_B$, and $(x_{mid}, y_{mid})$ are the coordinates of the intersection point of a straight line defined by points $(x_i, y_{Ai})$ and $(x_{i+1}, y_{Ai+1})$ and a straight line defined by points $(x_i, y_{Bi})$ and $(x_{i+1}, y_{Bi+1})$;

finally the similarity scores are calculated by:

Similarity score=$S_{A \cap B}/S_{A \cup B}$*100

Step V, outputting the similarity scores of the mobile softwares to give a mobile software similarity result, outputting the similarity scores of all mobile software pairs, calculating a time and storing in a text file.

The above example is a preferred embodiment of the present invention, which, however, is not intended to limit the embodiments of the present invention. Any other changes, modifications, substitutions, combinations, simplifications and the like can be made without departing from the spirit and principle of the present invention, and should be equivalent replacement and included in the protection scope of the present invention.

What is claimed is:

1. A method for intelligent determination of similarity of big data mobile softwares based on descriptive entropy, comprising the following steps:
   S1, acquiring a path for each of the mobile softwares to read the mobile softwares according to the paths;
   S2, performing a preliminary reverse-engineering decompilation on each of the mobile softwares to acquire function characteristics for each of the mobile softwares;
   S3, summarizing a descriptive entropy distribution for each of the mobile softwares through descriptive entropies in the function characteristics;
   S4, integrating the descriptive entropies of the mobile softwares, comparing the descriptive entropy distributions of mobile software pairs based on the integrated descriptive entropy distributions, and calculating similarity scores of the mobile software pairs; and
   S5, outputting the similarity scores of the mobile softwares to give a mobile software similarity result; wherein
   in step S2, the preliminary reverse-engineering decompilation specifically comprises:
   acquiring source codes for each of the mobile softwares using a decompilation tool, acquiring function compression codes for each of the mobile softwares through the source codes, and calculating a floating point number representing an amount of information of a function or class, that is, the descriptive entropy from each of the function compression codes by the following formula:

$Hd(\text{substr}_i) = -\Sigma_{i=0}^{n} p(\text{substr}_i) \log_2 p(\text{substr}_i)$ wherein, assuming that each of the function compression codes has n substrings, substn is the $I^{th}$ substring of the function compression code, and $p(\text{subste}_i)$ is the occurrence probability of the $I^{th}$ substring; and
   storing the function compression codes, descriptive entropies, and hash values for the mobile softwares in corresponding text files.

2. The method according to claim 1, wherein the function characteristics include: hash values, function compression codes, and descriptive entropies.

3. The method according to claim 1, wherein, for the function or class, one function or class corresponds to one function compression code, one descriptive entropy and one hash value; one mobile software corresponds to a set of function compression codes, a set of descriptive entropies, and a set of hash values for corresponding functions.

4. The method according to claim 1, wherein the decompilation tool is Androguard.

5. The method according to claim 1, wherein step S3 specifically comprises:
   extracting, from each of the text files corresponding to each of the mobile softwares in step S2, a set of descriptive entropies:

$Hd = \{hd_1, hd_2, hd_3, \ldots, hd_n\}$ and a set of corresponding numbers of entropies:

$N=\{n_1, n_2, n_3, \ldots, n_n\}$ wherein, $hd_1$ to $hd_n$ are the $1^{st}$ to the $n^{th}$ unequal descriptive entropy values of the corresponding mobile software; $n_1$ to $n_n$ are corresponding numbers of the $1^{st}$ to the $n^{th}$ unequal descriptive entropy values.

6. The method according to claim 5, wherein step S4 specifically comprises: acquiring the sets of descriptive entropies for all the mobile softwares, and integrating the sets of descriptive entropies for all the mobile software in pairs to obtain a union of descriptive entropies for each pair of the mobile softwares;

sets of descriptive entropies for mobile software A and mobile software B are as follows:

$Hd_A = \{hd_{A1}, hd_{A2}, hd_{A3}, \ldots, hd_{Am}\}$;

$Hd_B = \{hd_{B1}, hd_{B2}, hd_{B3}, \ldots, hd_{Bn}\}$;

wherein, $Hd_A$ is the set of descriptive entropies for mobile software A, $Hd_B$ is the set of descriptive entropies for mobile software B, m is a number of descriptive entropy values of mobile software A, and n is a number of descriptive entropy values of mobile software B;

sets of numbers of descriptive entropy values of mobile software A and mobile software B are as follows:

$N_A = \{n_{A1}, n_{A2}, n_{A3}, \ldots, n_{Am}\}$;

$N_B = \{n_{B1}, n_{B2}, n_{B3}, \ldots, n_{Bn}\}$;

wherein, $N_A$ is the set of corresponding numbers of descriptive entropy values in $Hd_A$ of mobile software A, and $N_B$ is the set of corresponding numbers of descriptive entropy values in $Hd_B$ of mobile software B;

the union of descriptive entropies for the mobile software pair is as follows:

$Hd_{A \cup B} = Hd_A \cup Hd_B$;

$Y_A = (y_{Ai} \mid i = 1, 2, \ldots, m + x)$;

$x = |Hd_{A \cup B} - Hd_A|$;

$y_{Ai} = \begin{cases} n_{Aj}, (hd_{A \cup Bi} \in Hd_A, hd_{A \cup Bi} = hd_{Aj}, n_{Aj} \in N_A) \\ 0, (hd_{A \cup Bi} \notin Hd_A) \end{cases}$;

$Y_B = (y_{Bi} \mid i = 1, 2, \ldots, n + y)$;

$y = |Hd_{A \cup B} - Hd_B|$;

$y_{Bi} = \begin{cases} n_{Bj}, (hd_{A \cup Bi} \in Hd_B, hd_{A \cup Bi} = hd_{Bj}, n_{Bj} \in N_B) \\ 0, (hd_{A \cup Bi} \notin Hd_B) \end{cases}$;

wherein, $Hd_{A \cup B}$ is the union of descriptive entropies of mobile software A and mobile software B, $Y_A$ is the set of corresponding numbers of descriptive entropy values of mobile software A in the union $Hd_{A \cup B}$, and $Y_B$ is the set of corresponding numbers of descriptive entropy values of mobile software B in the union $Hd_{A \cup B}$; x is a number of elements in the subtraction of $Hd_A$ from the union $Hd_{A \cup B}$, and y is a number of elements in the subtraction of $Hd_B$ from the union $Hd_{A \cup B}$; m+x and n+y are numbers of elements in the union $Hd_{A \cup B}$;

calculating similarity scores:

taking the sets $Hd_{A \cup B}$ and $Y_A$ as a set of discrete points $D_A$, and the sets $Hd_{A \cup B}$ and $Y_B$ as another set of discrete points $D_B$, there are:

$D_A = \{(x_i, y_i) \mid x_i \in Hd_{A \cup B}, y_i \in Y_A\}$;

$D_B = \{(x_i, y_i) \mid x_i \in Hd_{A \cup B}, y_i \in Y_B\}$;

a region $S_A$ in a Cartesian coordinate system is defined by the set of discrete points $D_A$ and the X axis; a region $S_B$ in the Cartesian coordinate system is defined by the set of discrete points $D_B$ and the X axis; an intersection area $S_{A \cap B}$ of the regions $S_A$ and $S_B$ is calculated, and a union area $S_{A \cup B}$ of the regions $S_A$ and $S_B$ is calculated; finally the similarity scores are calculated:

assuming that the number of elements in the set is N, there is:

$$S_{A \cap B} = \sum_{i=1}^{N-1} s_i;$$

wherein, $$s_i \begin{cases} (y_{mid} + \min(y_{Ai}, y_{Bi}))^*(x_{mid} - x_i)/2 + (y_{mid} + \min(y_{Ai+1}, y_{Bi+1}))^*(x_{i+1} - x_{mid})/2, ((y_{Ai} - y_{Bi})^*(y_{Ai+1} - y_{Bi+1}) < 0) \\ (\min(y_{Ai}, y_{Bi}) + \min(y_{Ai+1}, y_{Bi+1}))^*(x_{i+1} - x_i)/2, ((y_{Ai} - y_{Bi})^*(y_{Ai+1} - y_{Bi+1}) > 0) \end{cases}$$

$$S_{A \cup B} = \sum_{i=1}^{N-1} s'_i,$$

wherein, $$s'_i \begin{cases} (y_{mid} + \max(y_{Ai}, y_{Bi}))^*(x_{mid} - x_i)/2 + (y_{mid} + \max(y_{Ai+1}, y_{Bi+1}))^*(x_{i+1} - x_{mid})/2, ((y_{Ai} - y_{Bi})^*(y_{Ai+1} - y_{Bi+1}) < 0) \\ (\max(y_{Ai}, y_{Bi}) + \max(y_{Ai+1}, y_{Bi+1}))^*(x_{i+1} - x_i)/2, ((y_{Ai} - y_{Bi})^*(y_{Ai+1} - y_{Bi+1}) > 0) \end{cases}$$

wherein, $$x_{mid} = \frac{x_{i+1}(y_{Bi} - y_{Ai}) - x_i(y_{Bi+1} - y_{Ai+1})}{(y_{Bi} - y_{Ai}) - (y_{Bi+1} - y_{Ai+1})},$$

$$y_{mid} = \frac{y_{Ai+1}(y_{Bi} - y_{Ai}) - y_{Ai}(y_{Bi+1} - y_{Ai+1})}{(y_{Bi} - y_{Ai}) - (y_{Bi+1} - y_{Ai+1})},$$

wherein, $(x_i, y_{Ai}) \in D_A$, $(x_i, y_{Bi}) \in D_B$, and $(x_{mid}, y_{mid})$ are the coordinates of the intersection point of a straight line defined by points $(x_i, y_{Ai})$ and $(x_{i+1}, y_{Ai+1})$ and a straight line defined by points $(x_i, y_{Bi})$ and $(x_{i+1}, y_{Bi+1})$;

finally the similarity scores are calculated by:

Similarity score=$S_{A \cap B}/S_{A \cup B}*100$

7. The method according to claim 6, wherein m+x=n+y.

8. The method according to claim 1, wherein step S5 specifically comprises: outputting the similarity scores of all mobile softwares, and determining similarities between mobile softwares to obtain a result of mobile software similarity.

\* \* \* \* \*